Patented July 17, 1923.

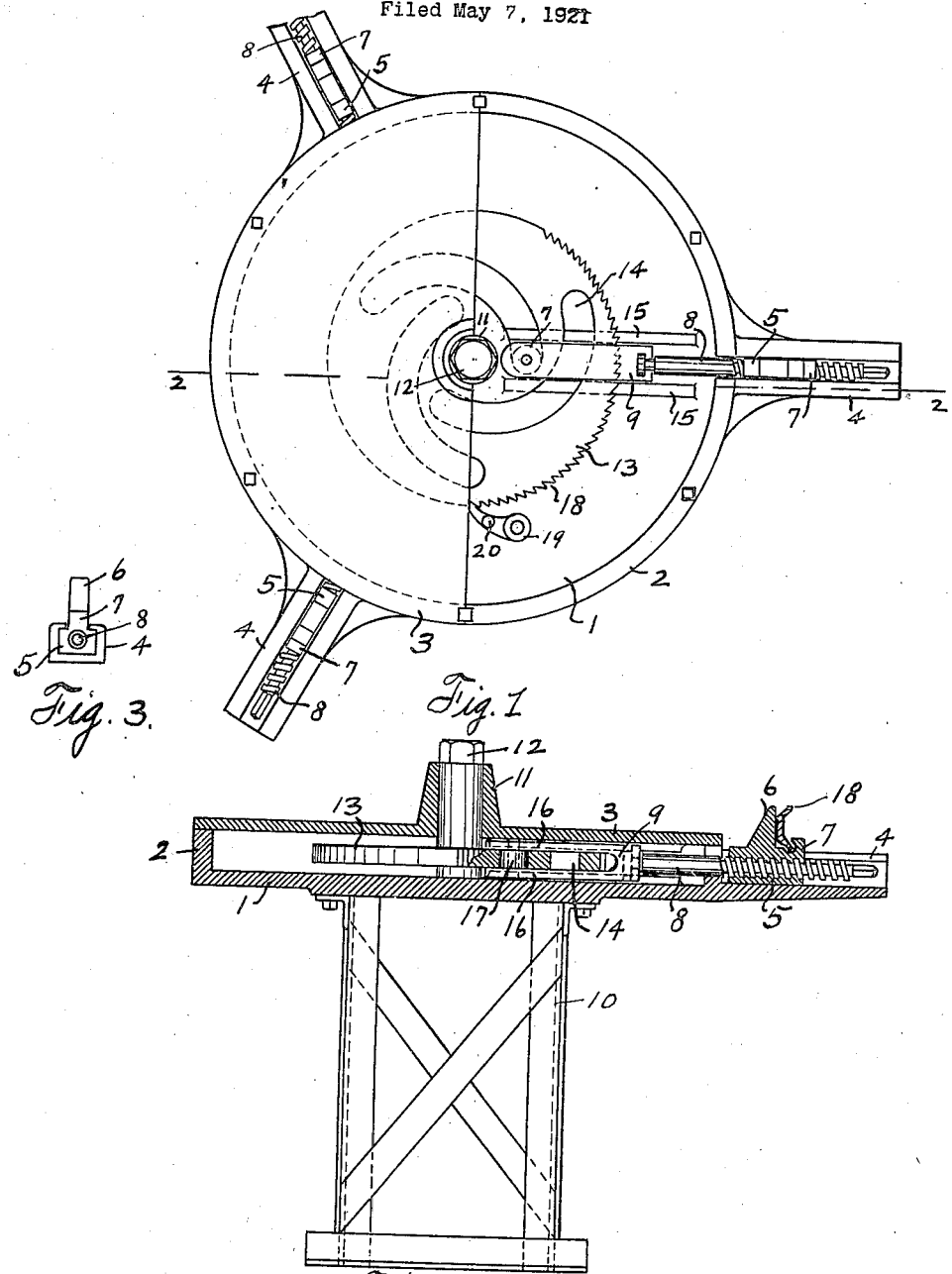

1,462,455

UNITED STATES PATENT OFFICE.

CHRISTIAN H. LARSON, OF GUFFEY, TEXAS.

TIRE-RIM RACK.

Application filed May 7, 1921. Serial No. 467,647.

*To all whom it may concern:*

Be it known that I, CHRISTIAN H. LARSON, a citizen of the United States, residing at Guffey, in the county of Jefferson and State of Texas, have invented certain new and useful Improvements in a Tire-Rim Rack, of which the following is a specification.

This invention relates to new and useful improvements in a tire rim rack.

One object of the invention is to provide a rack of the character described specially designed for use in mounting tires on, and demounting them from, wheel rims, and is so constructed that the rim may be readily expanded or contracted for this purpose.

With the above and other objects in view this invention has particular relation to certain novel features of construction, operation and arrangement of parts, an example of which is given in this specification, and illustrated in the accompanying drawings, wherein:—

Figure 1 is a plan view of the device, partially broken away, and showing half of the top plate removed.

Figure 2 is a transverse sectional view taken on the line 2—2 of Figure 1, and

Figure 3 is an end view of one of the lug guides.

In the drawings, the numeral 1 designates the bottom plate having the upturned marginal flange 2 on which the top plate 3 rests. These plates are held spaced apart by said flange and form an enclosed casing.

Formed integrally with the bottom plate there are the radiating guides 4, spaced a uniform distance apart. Slidably mounted in each guide there is a lug block 5, each having an upstanding lug 6 and a hook 7 beyond the lug. A coarsely threaded rod 8 is threaded through each block. The outer end of each rod is formed to receive a wrench and its inner end has a swivelling connection with the corresponding plunger 9. By turning said rods, as by means of a wrench, the lug blocks may be adjusted toward or from their corresponding plungers.

The rack in use is mounted on a suitable stand 10. The top plate is formed with a central bearing 11 in which the stub shaft 12 is mounted to rotate. The upper end of this shaft is formed to receive a wrench, as shown, and fixed to its lower end within the casing there is a disc 13, which is formed with cam shaped grooves 14, the number of grooves corresponding to the number of guides 4. The plungers 9 move radially in guideways 15, provided on the inner faces of the plates 1 and 2 and their inner ends are bifurcated, forming the fingers 16, 16, which embrace the disc 13. Between these fingers the roller bearings 17 are mounted, which work in the corresponding grooves 14.

In operation the tire rim 18 is mounted on the rack around the lugs 6 and in engagement with the hooks 7, as shown in Figure 2. A wrench is then applied to the stub shaft 12 and as said shaft is rotated the disc 13 will also rotate and the grooves 14, acting on the rollers 17 will force the plungers outwardly, or draw them inwardly, depending on the direction of rotation, and the tire rim will be correspondingly expanded or contracted.

A section of the margin of the disc 13 is serrated forming the teeth 18. A dog 19 is pivotally mounted in the casing in position to engage with said teeth to hold the rim expanded. This dog has a pin 20, by means of which it may be released to permit the contraction of the rim.

What I claim is:—

1. A tire rim rack including an enclosed casing formed of two plates, an overturned marginal flange carried by one of said plates and against which the other plate rests, radiating guides carried by one of said plates and spaced apart, a lug block slidable in each guide, an upstanding lug and a hook outside of said lug carried by each block, a rod threaded through each block, the upper end of each rod being formed to receive a wrench, radiating plungers within the casing, radiating guide ways in which said plungers move, the inner ends of said rods having swiveling connections with the corresponding plunger, a stand upon which said casing is mounted, a central bearing in the upper plate of the casing, a stub shaft rotatable in said bearing and whose upper end is formed to receive a wrench, a disc within the casing fixed to the lower end of said shaft, said disc being formed with cam shaped grooves, the inner ends of said plungers being bifurcated forming fingers which embrace said disc bearings mounted between said fingers and working in the corresponding grooves.

2. A tire rim rack including an enclosed casing formed of two plates, an overturned marginal flange carried by one of said plates and against which the other plate rests, radiating guides carried by one of said plates and spaced apart, a lug block slidable in each guide, an upstanding lug and a hook outside of said lug carried by each block, a rod threaded through each block, the upper end of each rod being formed to receive a wrench, radiating plungers within the casing, radiating guide ways in which said plungers move, the inner ends of said rods having swiveling connections with the corresponding plunger, a stand upon which said casing is mounted, a central bearing in the upper plate of the casing, a stub shaft rotatable in said bearing and whose upper end is formed to receive a wrench, a disc within the casing fixed to the lower end of said shaft, said disc being formed with cam shaped grooves, bearings carried by the inner ends of said plungers and working in the corresponding grooves, ratchet teeth carried by the margin of said disc and a dog pivotally mounted in the casing and arranged to engage with said teeth.

In testimony whereof I have signed my name to this specification in the presence of two subscribing witnesses.

CHRISTIAN H. LARSON.

Witnesses:
E. V. HARDWAY,
A. BOSS-KOEFORD.